(12) United States Patent
Shinoda

(10) Patent No.: US 7,182,265 B2
(45) Date of Patent: *Feb. 27, 2007

(54) METHOD AND SYSTEM FOR CHECKING AN ORIGINAL RECORDED INFORMATION

(75) Inventor: Takashi Shinoda, Nagareyama (JP)

(73) Assignee: Hitachi, Ltd., Tokyo (JP)

( * ) Notice: Subject to any disclaimer, the term of this patent is extended or adjusted under 35 U.S.C. 154(b) by 745 days.

This patent is subject to a terminal disclaimer.

(21) Appl. No.: 10/339,314

(22) Filed: Jan. 10, 2003

(65) Prior Publication Data
US 2003/0133153 A1 Jul. 17, 2003

(30) Foreign Application Priority Data
Jan. 11, 2002 (JP) ............... 2002-005122

(51) Int. Cl.
G06K 19/06 (2006.01)
(52) U.S. Cl. .................. 235/492; 235/487
(58) Field of Classification Search ........... 235/492, 235/380, 487, 485
See application file for complete search history.

(56) References Cited

U.S. PATENT DOCUMENTS

2003/0093379 A1* 5/2003 Hatanaka ............ 705/43
2003/0217274 A1* 11/2003 Nagatsuka ........... 713/179
2005/0017072 A1* 1/2005 Tomita ................ 235/451
2005/0116049 A1* 6/2005 Kobayashi ............ 235/492

FOREIGN PATENT DOCUMENTS

JP A-11-238049 8/1999

* cited by examiner

Primary Examiner—Thien M. Le
Assistant Examiner—Edwyn Labaze
(74) Attorney, Agent, or Firm—Mattingly, Stanger, Malur & Brundidge, P.C.

(57) ABSTRACT

A method includes the step of transmitting by a server to a printer, recorded information image data generated from the recorded information or the information to be recorded on a recording medium; the step of receiving, from the printer which receives and stores the original image, an ID of a contactless IC chip, the ID read by the printer from the recording medium; the step of linking the ID to the recorded information image data and recording them in a database; the step of receiving, from a reader terminal, an ID as a confirmation information read by the reader terminal from a recording medium to be checked; and the step of making a search, according to the confirmation information, through the database for recorded information image data corresponding to the ID and transmitting the recorded information image data to an output terminal.

15 Claims, 3 Drawing Sheets

FIG. 2

| CHIP ID | ORIGINAL IMAGE DATA | DIGITAL SIGNATURE | DATA STORAGE DATE |
|---|---|---|---|
| A0000001 | c:¥bcde···.pdf | skgfasjfg·· | 2001/08/09 13:51 |
| A0000002 | c:¥fghij···.pdf | wifweifiwf·· | 2001/08/09 13:55 |
| A0000003 | c:¥klmno···.pdf | rtuasiug·· | 2001/08/11 03:05 |
| ⋮ | ⋮ | ⋮ | ⋮ |

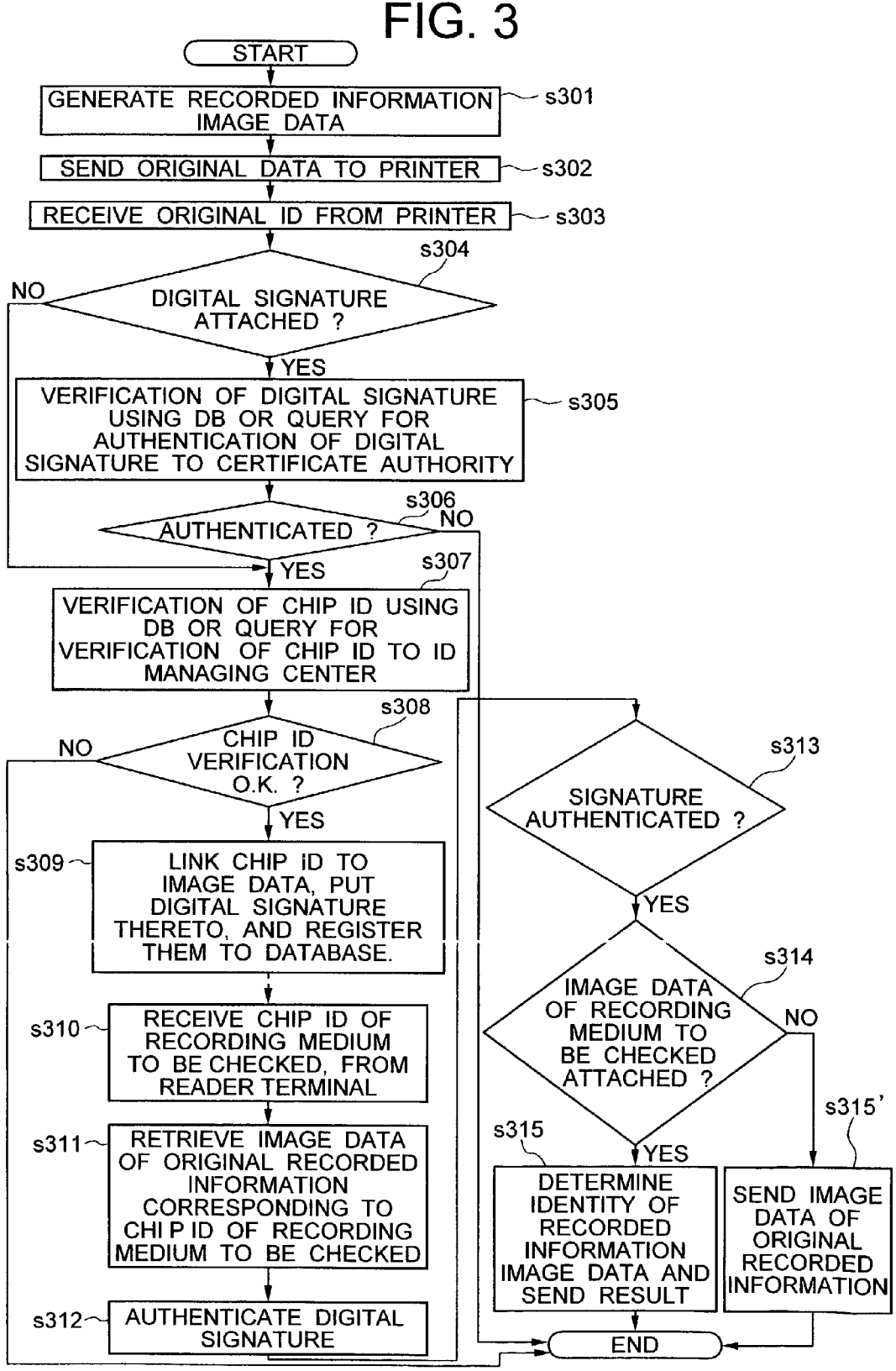

METHOD AND SYSTEM FOR CHECKING AN ORIGINAL RECORDED INFORMATION

CROSS-REFERENCE TO RELATED APPLICATION

This application relates to U.S. patent application Ser. No. 10/331,657 filed on Dec. 31, 2002 based on Japanese Application No. 2002-005121 filed on Jan. 11, 2002 and assigned to the present assignee. The content of the application is incorporated herein by reference.

BACKGROUND OF THE INVENTION

The present invention relates to a method of checking authenticity of recorded information recorded on a recording medium or of confirming identity of recorded information recorded on a recording medium with original recorded information corresponding to the recorded information, using a contactless integrated circuit (IC) chip having recorded a unique identifier (ID) assigned thereto.

In an operation to transfer official documents to be transferred between government and municipal offices, companies, and/or individual persons or sheets of paper on which documents are recorded and which have value, for example, securities and/or notes, it is important to confirm authenticity thereof, namely, such items are actually associated with their original information. Items of which authenticity attracts attention due to value thereof include art objects, industrial art objects, and photos. In a situation in which it is required to confirm authenticity of various recorded information recorded on a recording medium in various forms such as characters and letters, graphic images, symbols, pseudo-solid contours, combinations of these items, and/or combinations of these items with colors, each of the recorded information becomes an object to be confirmed or checked.

One of the forms of recorded information is, for example, a document including a set of characters. In a most common method to confirm authenticity of a document, a seal impression is put on the document or a bar code is printed thereon. For example, in a commercial transaction, a partner of the transaction having received a document with a seal impression put thereon confirms authenticity of the document as follows. The receiver of the document makes a check to determine whether or not the seal impression is associated with a seal beforehand registered to, for example, a municipal office to resultantly confirm truth or falsehood of the document. In another case in which the document is generated as electronic information, a digital signature is used in place of the seal impression to confirm authenticity of the document. JP-A-11-238049 proposes another method of confirming authenticity of a document using summary information in place of the digital signature. This method produces summary information by applying a function, i.e., a summary function to each of information files of an original document and a document of which authenticity is to be confirmed. The method verifies the summary information with each other to resultantly confirm authenticity of the document.

However, the methods of the prior art are open to further improvement. For example, in the method using a seal impression, if the seal used to produce the seal impression is stolen and is put to a document including recorded information, authenticity of the document is normally and successfully achieved. That is, it is difficult to determine that the recorded information is actually true or false. The methods cannot be fully applicable to a document on which a bar code or the like including authentication information beforehand encoded. In this case, if a part of the bar code is cut off and is pasted on a document, authenticity of the document will be confirmed. On the other hand, the invention of JP-A-11-238049 describing the confirmation method of the prior art for electronically recorded information is also open to further improvement. The method is inherently limited to electronic documents. In addition, although forging and stealing of a digital signature and an electronic certificate require troublesome human power and a long period of time, if the forging or the like is successfully achieved, authenticity of such documents cannot be completely and satisfactorily confirmed. Heretofore, no method has been proposed which closely and not separably relates recorded information of a document, a graphic image, or the like recorded on one of various recording media such as a sheet of paper through a printing operation or the like to information indicating that the recorded information is actually produced from its original to thereby confirming authenticity of the recorded information.

SUMMARY OF THE INVENTION

It is therefore an object of the present invention, which has been proposed in consideration of the problems above, to provide a method of and a system for checking original recorded information to simply confirm the original recorded information with high reliability.

To achieve the object according to the present invention, there is provided a method of checking original recorded information with respect to recorded information recorded on a recording medium, using a contactless IC chip having stored a unique ID linked to the contactless IC chip. The method includes an original image transmitting step of transmitting by a server, to a printer, recorded information image data generated from recorded information or information to be recorded on the recording medium; an original ID receiving step of receiving, from the printer which receives the original image to store the image on a recording medium, an ID of a contactless IC chip mounted on the recording medium, the ID being obtained through a reading operation conducted by the printer; an original data registering step of linking the ID of the IC chip to the recorded information image data and recording the ID and the image data in a database; a confirmation information receiving step of receiving, from a reader terminal, an ID of a contactless IC chip mounted on a recording media to be checked, the ID being obtained through a reading operation conducted by the reader terminal for the recording medium having stored recorded information of which original recorded information is to be checked; and an image transmitting step of making a search, according to the ID received as confirmation information from the reader terminal, through the database for recorded information image data corresponding to the ID and transmitting the recorded information image data to an output terminal.

Other objects, features and advantages of the invention will become apparent from the following description of the embodiments of the invention taken in conjunction with the accompanying drawings.

BRIEF DESCRIPTION OF THE DRAWINGS

FIG. 2 is a table showing an example of a data layout in an embodiment of an original recorded data managing database.

FIG. 3 is a flowchart showing an actual procedure of a method of checking original recorded information in the embodiment.

DESCRIPTION OF THE EMBODIMENTS

Figure 1:
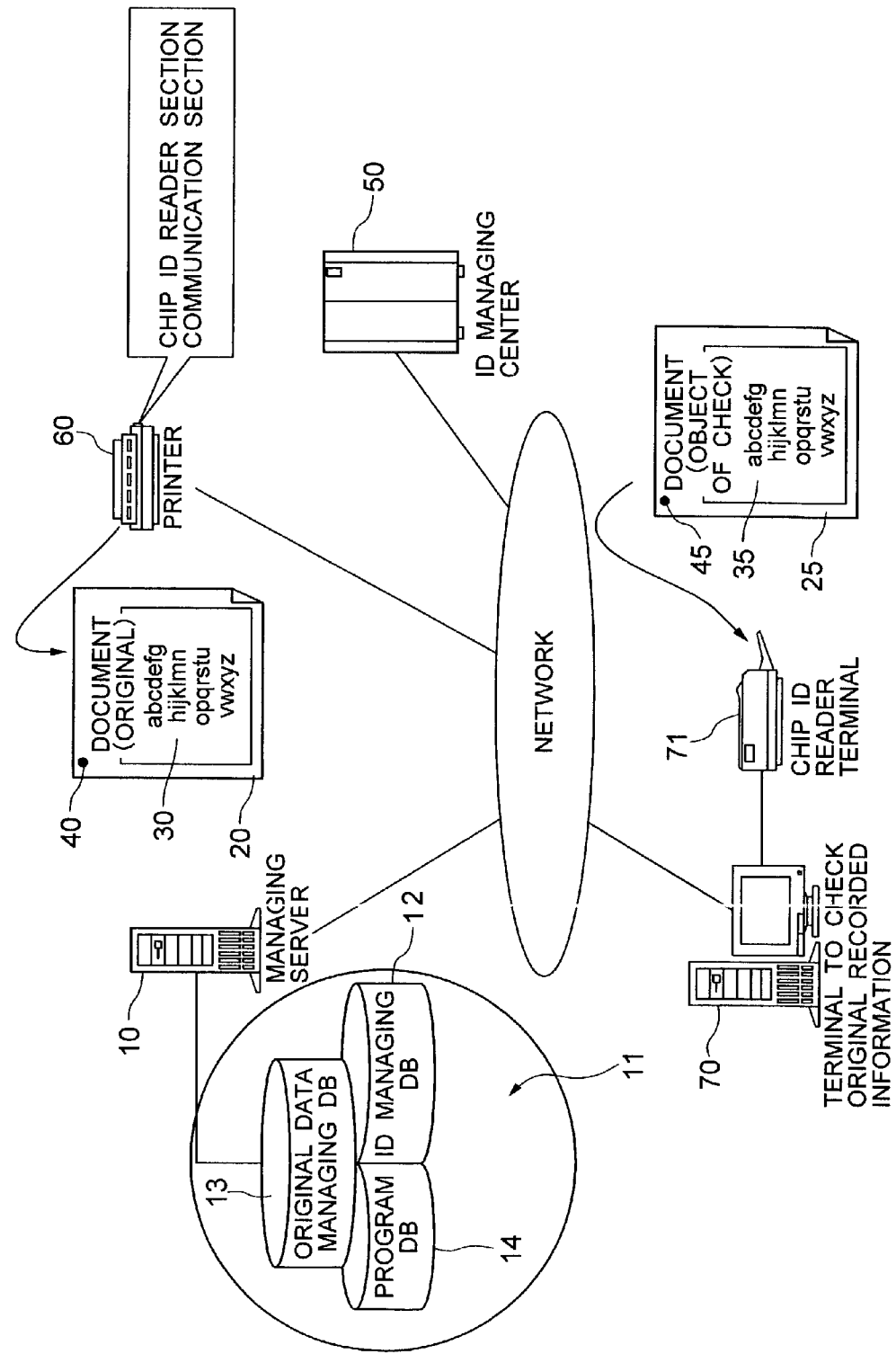
FIG. 1 is a diagram showing a network configuration including an embodiment of a system for checking original recorded information.

Referring now to the drawings, description will be given in detail of an embodiment of the present invention. FIG. 1 shows a network configuration including an embodiment of a system for checking original recorded information. FIG. 2 shows an example of a data layout in an embodiment of an original recorded data managing database. Assume as a background of the embodiment a situation in which an organization operates a managing server 10 achieving the method of checking original recorded information of the present invention. The server 10 checks original recorded information of a document 30 recorded in a file (or on a recording medium) 20 which the organization supervises or for which the organization has an authorized level to certify that the document 30 is actually associated with the original recorded information. In this case, a contactless IC chip 40 is watermarked in the file 20. For example, the organization sets an identifier (chip ID) to the chip 40 and issues and manages the chip 40. Or, it is also possible that an ID managing center 50 (a chip ID issuing and certificate authority) of a third-party organization issues and manages the contactless IC chip 40 or a recording medium with the chip 40, for example, by embedding the chip 40 in the medium. It is to be appreciated that the present invention is not restricted only by these embodiments but is applicable to any situations in which for recorded information recorded on a recording medium in various formats, original recorded information is checked for authenticity of the information recorded on the medium.

The managing server 10 operated by the organization transmits using by an appropriate communication unit a document (recorded information) 30 to be recorded, for example, in the file 20 as a recording medium or original image data (recorded information image data) produced from the document 30. The server 10 receives a chip ID of the contactless IC chip 40 on the recording medium as an original recorded information ID from the printer 60 and image data of a document 35 recorded in a file 25 as a recording medium to be checked and a chip ID of the contactless IC chip 45 from the terminal 70 to check original recorded information. Although the reader terminal 70 is connected via a network to the server 10 in this case, it is also possible to use the reader terminal 70 in the form of a unit to be attached to the server 10. That is, the terminal 70 is directly connected to an input/output (I/O) port of the server 10. For authentication of the received chip ID, the chip ID is verified using an ID managing database 12 or a query for authentication of the chip ID is issued to an ID managing center 50 to receive a result of the query.

For synchronization with the ID managing center 50, a database 11 of the database 12 receives chip ID information from the center 50 at suitable timing and copies the information to appropriately update the information. When the managing server 10 issues and manages the chip ID, the center 50 and the operation to update the chip ID information are not required. The original recorded data ID or the original ID received from the printer 60 is registered to an original data managing database 13 with a correspondence established between the original ID and the image data of original recorded information. FIG. 2 shows the format in a data layout example 200.

In the embodiment, each data record includes a chip ID as a key, a file name of original image data, a digital signature produced by the printer 60, and a data storage date. The digital signature may be, in addition to that described above, a digital signature associated with a secret key possessed by the managing server 10. If the server 10 puts, each time original data is registered to the original data managing database 13, a digital signature thereto, data falsified by a third person can be detected to suppress such an invalid or illegal operation. Naturally, this also leads to a similar advantage also when a digital signature produced by the printer 60 is used and possibly leads to improvement of security in data communication between the printer 60 and the managing server 10. In addition, the record of the data storage date leads to an advantageous as follows. For example, even when a person falsifies recorded information such as a document and registers the falsified information as original data again, it is possible to recognize records of the original data first recorded. A program database 14 stores application programs to conduct operations to be executed in association with data communication with the printer 60 and the terminal 70 to check original recorded information. For example, the programs are used to conduct operations to register original data and to read original data and an operation to refer to data.

The managing server 10 can naturally operate as a Web server or a mail server. The ID managing database 12, the original data managing database 13, and the program database 14 of the database 11 are installed in an appropriate storage such as a hard disk. It is possible to collectively store the databases in one storage. Or, the databases may be stored in respective storages, which are connected via a network to each other for organic operation.

The ID managing center 50 issues a chip ID of a contactless IC chip 40 as well as a contactless IC chip 40 on which the chip ID is recorded. When a query for authenticity is received from the managing server 10, the center 50 confirms truth or falsehood of the chip 40 by authenticating the chip 40 associated with the printer 60 or the terminal to check original recorded information 70. The center 50 can be regarded as a chip ID issuing and certificate authority. The chip ID is issued to the contactless IC chip 40 with a one-to-one correspondence therebetween, and hence duplication of the chip ID is impossible. When the managing server 10 issues and manages the chip ID, the ID managing center 50 is not required.

If security and synchronization can be retained and shared for the chip ID of the chip 40 in the ID managing database 12 between the managing server 10 and the ID managing center 50, the server 10 and the center 50 may be implemented by one computer unit or the server 10 and the center 50 may be connected via a network for organic operation.

The printer 60 receives the document 30 as recorded information or original image data (recorded information image data) produced from the information to store the image data on the recording medium. The printer 60 reads the contactless IC chip 40 mounted on the file 20 to resultantly obtain an original ID and sends the ID to the managing server. Ordinarily, since the organization managing the server 10 also registers the original data, the printer 60 is installed, for example, in each division or section of the organization. The printer 60 includes an inherent printing function and a chip ID reader section to read the chip ID of the contactless IC chip 40 mounted on the file 20. To the original ID, the printer 60 puts, for example, a digital signature, and then a communication unit sends the ID by via a network to the managing server 10. When the managing server 10 and the printer 60 are configured in one unit, it is not required to conduct the communication of the original ID via the network.

The terminal 70 as a reader terminal includes a chip ID reader terminal 71 to read a file which is a recording medium 25 to be checked and which records information as an object of the check. The terminal 70 sends information obtained by the check to the managing server 10. The reader terminal 71 includes at least a chip ID reading function to read a chip ID of a contactless IC chip 45 mounted on the recording medium 25 and preferably includes a scanner function to acquire image data (recorded information image data) of recorded information 35 of a file and the like on the recording medium 25. If the terminal 70 and the reader terminal 71 are configured in one unit together with the managing server 10, the configuration described above in which these components are connected to each other via the a network to each other is not required. It is also possible that the terminal 70 and the reader terminal 71 are implemented by one unit in a sharing manner or are configured in one block.

The printer 60 is not limited to the device of general printer type shown in FIG. 1. The terminal 60 may be any device including a computer chip of any type if the device is connectible to a network and includes the reader function to read the contactless IC chip 40 and the output function to output the recorded information 30 to the recording medium 20. That is, the terminal 60 may be, for example, a mobile or portable telephone, a kiosk terminal, a personal digital assistant (PDA), a game machine, a digital television set, or a facsimile device.

The chip ID reader terminal 71 is not limited to the device of scanner type shown in FIG. 1. The terminal 60 may be any device including a computer chip of any type if the device is connectible to a network and includes at least the reader function to read the contactless IC chip 40 and favorably the scanner function to scan the recorded information 30.

The network to establish desired connections between the managing server 10, the ID managing center 50, the printer 60, and the terminal 70 to check original recorded information includes, in addition to the internet, a personal computer communication line, a local area network (LAN), a wide area network (WAN), an asynchronous transfer mode (ATM) network, and a wireless network.

The contactless IC chip 40 is a so-called RFID (Radio Frequency IDentifier) chip including an antenna therein. Using the antenna, the chip can receive power and readout data from the printer 60 and the chip ID reader terminal 71. The chip includes a central processing unit (CPU), a random access memory (RAM), a read-only memory (ROM), and an electrically erasable programmable ROM (EEPROM). The chip ID is recorded, for example, in the nonvolatile ROM dedicated to readout operation or the nonvolatile, electrically rewritable EEPROM. The chip ID is a unique number assigned to each contactless IC chip 40. The chip IC may be assigned according to a numbering rule of a JAN (Japanese Article Number) code, for example, for each section or each information type of the record information 30 recorded on the recording medium 20.

FIG. 3 shows a flow of an actual procedure of a method of checking original recorded information in the embodiment. Description will now be given of the actual procedure of the method. Assume, for example, that a public and/or municipal office operates the managing server 10 and manages official qualifications which are essential for any person to take a business chance. Under this condition, a person who wants to get the business chance and who has the official qualifications requests the office to issue a certificate that the person has the qualifications. On the other hand, a provider of the business chance receives the certificate presented by the person requesting the business chance. The provider requests the office to check original recorded information of the certificate and receives a result of the check. Through the check of the original recorded information with respect to the certificate, it is possible to determine whether or not the person requesting the business chance has been actually qualified by the office.

In this case, the office which receives the request for issuance of the certificate and issues the certificate beforehand outputs the document 30 to the printer to print the document 30 on the certificate for qualifications 20 as the recording medium. The server 10 generates original document image data (recorded information image data) from the document 30 as recorded information to be recorded on the certificate 20 (s301). The server 10 then sends the image data to the printer 60 (s302). Or, the server 60 sends the document information to the printer 60 without any modification. The printer 60 prints the document information or the image data as an original image onto the certificate 20. The printer 60 also reads the contactless IC chip 40 mounted on the certificate 20 to obtain the chip IC of the IC chip 40. The managing server 10 receives from the printer 60 the chip ID as an original ID (s303).

Having received the original ID, the managing server 10 makes a check to determine whether or not a digital signature produced by the printer 60 is attached to the original ID (s304). When security management is highly required in the data communication, for example, because the printer 60 is connected via a network to the managing server 10, it is favorable that, for example, the printer 60 puts a digital signature to the original ID using a cipher key assigned thereto and sends the ID to the managing server 10. If the digital signature is present, the server 10 executes authentication processing for the digital signature using the database 11 or issues a request to an authentication organization such as an authentication office to authenticate the digital signature (s305). If a result of authentication indicates falsehood of the digital signature, the server 10 terminates the processing.

If the digital signature is successfully authenticated or the original ID has not such a digital signature (s306), the server 10 executes authentication processing for the original ID. The server 10 checks the ID by original ID verification in the ID managing database 12 of the server 10 or by issuing a verification request for the original ID to the ID managing center 50 (s307). As a result, if the original ID from the printer 60 actually exists and is correct (true; s308), the server 10 links the ID to the original image data, puts a digital signature thereto using an encryption key of the server 10, and registers the ID to the original data managing database 13 (s309). If the chip ID is absent or if the verification result indicates any fear of falsification, the server 10 terminates the processing.

Finally, the original data is completely registered with a one-to-one correspondence established between the original document image data of the document 30 to be printed on the certificate 20 and the chip ID (original ID) of the ID chip 40 embedded in the certificate 20. The office sends the certificate 20 of which the original data has been completely registered and which has been printed by the printer 60, to the person requesting the business chance. The person then presents the certificate to the provider of the business chance. The provider checks the certificate with respect to original recorded information thereof to determine whether or not the person has the qualifications certified by the office.

The person providing the business chance brings the certificate 20 to a window of the public or municipal office or a branch office thereof. The person installs the certificate 20 as a recording medium 25 to be checked, at a predetermined position of a chip ID reader terminal 71 in the office. The terminal 71 reads the recording medium 25 having recorded record information 35 to be checked and obtains a chip ID of the contactless ID chip 45 from the recording medium 25. Preferably, the terminal 71 reads, in addition to the chip ID, document image data, i.e., image data of the recorded information 35. To the data items read by the reader terminal 71, the terminal 71 or the terminal 70 to check original recorded information preferably puts a digital signature and then sends the data items as confirmation information to the managing server 10.

The server 10 receives the confirmation information (s310). According to the chip ID in the information, the server 10 makes a search through the original data managing database 13 for original document image data corresponding to the ID (s311). The server 10 executes authentication processing for the digital signature of the confirmation information and that of the retrieved original document image data (original recorded information image data; s312). As described above, the processing is executed in one of two cases. That is, the authentication processing is conducted by the database 11 or a request is issued to the authentication organization for the authentication to obtain a result of authentication. As a result of the processing, if it is determined that the original document image data has been falsified or the digital signature put by the terminal 70 to check original recorded information to the confirmation information is invalid or illegal, the server 10 terminates the processing.

If the signature authentication is normally terminated (s313), the server 10 makes a check to determine whether or not document image data of the certificate as the recording medium 25 is attached to the confirmation information (s314). If such document image data is absent, the server 10 sends the original document image data to the terminal 70 to check original recorded information (s315'). The terminal to which the original document image data is not limited to the terminal 70. If the terminal 70 is configured as one unit together with the managing server 10, the image data may be sent to an output device such as a display or a printer of the server 10.

If the document image data of the recording medium 25 is attached to the confirmation information, the server 10 makes a check for identity of the document image data, for example, by verifying the document image data with the original document image data. The server 10 sends a result of the check to the terminal 70 as above (s315) and then terminates the processing.

In another embodiment of the present invention, the procedure to receive confirmation information described above may be modified as follows. In the procedure, the recorded information image data obtained by reading by the reader terminal the recording medium having stored recorded information to be checked and the ID of the contactless IC chip mounted on the recording medium are received from the reader terminal. In the procedure to send the image, the image data of original recorded information as original data corresponding to the ID received in the procedure to receive confirmation information is retrieved from the database. Between the image data of original recorded information and the recorded information image data from the recording medium to be checked, an identity check is conducted to send a result of the check to the output terminal. According to the embodiment, only the result of the check of original recorded information can be simply obtained with high reliability. The processing for an operator to visually verify by her or his eyes the image data of recorded information with the recorded information recorded on the recording medium to be checked can be dispensed with. This reduces the human power and the cost required for the processing.

In the procedure of the method to receive original ID, the digital signature assigned by the printer is also received together with the original ID from the printer. In the procedure to register original recorded data, the digital signature is recorded with a correspondence established between the signature and the original ID. In this embodiment, when the printer is connected via a network to the server, security of the data communication is improved therebetween.

In the method, the server puts a digital signature to the recorded information or the recorded information image data to be transmitted in the original image transmitting procedure and a digital signature to the original recorded data in the original data registering procedure. According to this embodiment, when the printer is connected to the server via a network, security can be improved in the data communication therebetween, and invalid or illegal falsification or the like for the original recorded data registered to the database can be appropriately suppressed or detected.

According to the present invention, there is also provided a server system for checking original recorded information with respect to recorded information recorded on a recording medium, using a contactless IC chip having stored a unique ID linked to the contactless IC chip. The server system includes an original image transmitting unit for transmitting, to a printer, recorded information to be recorded on the recording medium or recorded information image data generated from the recorded information; an original ID receiving unit for receiving, from the printer which receives the original image to store the image on a recording medium, an ID of a contactless IC chip mounted on the recording medium, the ID being obtained through a reading operation conducted by the printer; an original data registering unit for linking the ID of the IC chip to the recorded information image data and recording the ID and the image data in a database; a confirmation information receiving unit for receiving, from a reader terminal, an ID of a contactless IC chip mounted on a recording media to be checked, the ID being obtained through a reading operation conducted by the reader terminal for the recording medium having stored recorded information of which original recorded information is to be checked; and an image transmitting unit for making a search, according to the ID received as confirmation information from the reader terminal, through the database for recorded information image data corresponding to the ID and transmitting the recorded information image data to an output terminal. According to the embodiment, there is provided a simple system for checking original recorded information with high reliability.

According to the present invention, there is also provided a program product for implementing on a server a method of checking original recorded information with respect to recorded information recorded on a recording medium, using a contactless IC chip having stored a unique ID linked to the contactless IC chip. The program product includes an original image transmitting part for transmitting, to a printer, recorded information to be recorded on the recording medium or recorded information image data generated from the recorded information; an original ID receiving part for receiving, from the printer which receives the original image to store the image on a recording medium, an ID of a contactless IC chip mounted on the recording medium, the ID being obtained through a reading operation conducted by the printer; an original data registering part for linking the ID of the IC chip to the recorded information image data and recording the ID and the image data in a database; a confirmation information receiving part for receiving, from a reader terminal, an ID of a contactless IC chip mounted on a recording media to be checked, the ID being obtained through a reading operation conducted by the reader terminal for the recording medium having stored recorded information of which original recorded information is to be checked; and an image transmitting part for making a search, according to the ID received as confirmation information from the reader terminal, through the database for recorded information image data corresponding to the ID and transmitting the recorded information image data to an output terminal. According to the embodiment, there is provided a simple method of checking, on a server, original recorded information with high reliability.

According to the present invention, there is also provided a computer readable recording medium having recorded thereon the program product for checking original recorded information.

According to the present invention, there is also provided a reader terminal for use with the method of checking original recorded information. The reader terminal includes an ID reading unit for reading an ID of a contactless IC chip and a scanner unit for reading image data of recorded information recorded on a recording medium. According to the embodiment, a method of and a system for checking original recorded information of the present invention can be suitably implemented.

According to the present invention, there is also provided a printer for use with the method of checking original recorded information including an ID reading unit to read an ID of a contactless ID chip. According to the embodiment, a method of and a system for checking original recorded information of the present invention can be suitably implemented.

In the embodiments according to the present invention, recorded information of a document, a graphic image, or the like recorded on one of various recording media such as a sheet of paper through a printing operation or the like is closely and not separably related to information indicating that the recorded information is produced from its original. This leads to an advantage to simply confirm authenticity of the recorded information with high reliability.

According to the present invention, there is provided a method of and a system for simply checking original recorded information with respect to the recorded information, with high reliability.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method of checking original recorded information with respect to recorded information recorded on a recording medium, using a contactless IC chip having stored a unique ID linked to the contactless IC chip, comprising:

an original image transmitting step of transmitting by a server, to a printer, recorded information to be recorded on the recording medium or recorded information image data generated from the recorded information;

an original ID receiving step of receiving, from the printer which receives the original image to store the image on a recording medium, an ID of a contactless IC chip mounted on the recording medium, the ID being obtained through a reading operation conducted by the printer for the recording medium;

an original data registering step of linking the ID of the IC chip to the recorded information image data and recording the ID and the image data in a database;

a confirmation information receiving step of receiving, from a reader terminal, an ID of a contactless IC chip mounted on a recording media to be checked, the ID being obtained through a reading operation conducted by the reader terminal for the recording medium having stored recorded information of which original recorded information is to be checked; and an image transmitting step of making a search, according to the ID received as confirmation information from the reader terminal, through the database for recorded information image data corresponding to the ID and transmitting the recorded information image data to an output terminal.

2. A method of checking original recorded information according to claim 1, wherein:

the confirmation information receiving step further includes the step of receiving from the reader terminal the recorded information image data and the ID of the contactless IC chip mounted on the IC chip obtained through the reading operation conducted by the reader terminal; and the image transmitting step further includes the step of making a search through the database for image data of original recorded information as original data corresponding to the ID received in the confirmation information receiving step, making a check for identity between the image data of original recorded information and the recorded information image data from the recording medium to be checked, and transmitting a result of the check to an output terminal.

3. A method of checking original recorded information according to claim 1, wherein:

the original ID receiving step further includes the step of receiving a digital signature put by the printer together with the original ID from the printer; and the original data registering step further includes the step of recording the digital signature with a relationship established between the signature and the original ID.

4. A method of checking original recorded information according to claim 1, wherein:

the original image transmitting step includes the step of putting by a server a digital signature to the recorded information or the recorded information original data to be transmitted; and the original data registering step includes the step of putting a digital signature to the original data to be registered.

5. A server system for checking original recorded information with respect to recorded information recorded on a recording medium, using a contactless IC chip having stored a unique ID linked to the contactless IC chip, comprising:

original image transmitting means for transmitting, to a printer, recorded information to be recorded on the recording medium or recorded information image data generated from the recorded information;

original ID receiving means for receiving, from the printer which receives the original image to store the image on a recording medium, an ID of a contactless IC chip mounted on the recording medium, the ID being obtained through a reading operation conducted by the printer for the recording medium;

original data registering means for linking the ID of the IC chip to the recorded information image data and recording the ID and the image data in a database;

confirmation information receiving means for receiving, from a reader terminal, an ID of a contactless IC chip mounted on a recording media to be checked, the ID being obtained through a reading operation conducted by the reader terminal for the recording medium having stored recorded information of which original recorded information is to be checked; and image transmitting means for making a search, according to the ID received as confirmation information from the reader terminal, through the database for recorded information image data corresponding to the ID and transmitting the recorded information image data to an output terminal.

6. A program product for implementing on a server a method of checking original recorded information with respect to recorded information recorded on a recording medium, using a contactless IC chip having stored a unique ID linked to the contactless IC chip, comprising:

an original image transmitting part for transmitting, to a printer, recorded information to be recorded on the recording medium or recorded information image data generated from the recorded information;

an original ID receiving part for receiving, from the printer which receives the original image to store the image on a recording medium, an ID of a contactless IC chip mounted on the recording medium, the ID being obtained through a reading. operation conducted by the printer for the recording medium;

an original data registering part for linking the ID of the IC chip to the recorded information image data and recording the ID and the image data in a database;

a confirmation information receiving part for receiving, from a reader terminal, an ID of a contactless IC chip mounted on a recording media to be checked, the ID being obtained through a reading operation conducted by the reader terminal for the recording medium having stored recorded information of which original recorded information is to be checked; and an image transmitting part for making a search, according to the ID received as confirmation information from the reader terminal, through the database for recorded information image data corresponding to the ID and transmitting the recorded information image data to an output terminal.

7. A computer readable recording medium having recorded thereon a program product for checking original recorded information according to claim 6.

8. A reader terminal for use with a method of checking original recorded information according to claim 1, comprising:
ID reading means for reading an ID of a contactless IC chip; and
scanner means for reading image data of recorded information recorded on a recording medium.

9. A reader terminal for use with a method of checking original recorded information according to claim 2, comprising:
ID reading means for reading an ID of a contactless IC chip; and
scanner means for reading image data of recorded information recorded on a recording medium.

10. A reader terminal for use with a method of checking original recorded information according to claim 3, comprising:
ID reading means for reading an ID of a contactless IC chip; and
scanner means for reading image data of recorded information recorded on a recording medium.

11. A reader terminal for use with a method of checking original recorded information according to claim 4, comprising:
ID reading means for reading an ID of a contactless IC chip; and
scanner means for reading image data of recorded information recorded on a recording medium.

12. A printer for use with a method of checking original recorded information according to claim 1, comprising ID reading means for reading an ID of a contactless IC chip.

13. A printer for use with a method of checking original recorded information according to claim 2, comprising ID reading means for reading an ID of a contactless IC chip.

14. A printer for use with a method of checking original recorded information according to claim 3, comprising ID reading means for reading an ID of a contactless IC chip.

15. A printer for use with a method of checking original recorded information according to claim 4, comprising ID reading means for reading an ID of a contactless IC chip.

* * * * *